Sept. 26, 1950  R. E. SUTHERLAND  2,523,545
ADJUSTABLE CONCAVE TRUSS WITH CONTROLLED SWIVEL
Filed April 26, 1948

INVENTOR.
Roy E. Sutherland
BY Chas. Denegre
Attorney.

Patented Sept. 26, 1950

2,523,545

UNITED STATES PATENT OFFICE 2,523,545

ADJUSTABLE CONCAVE TRUSS WITH CONTROLLED SWIVEL

Roy E. Sutherland, Fayette, Ala.

Application April 26, 1948, Serial No. 23,253

1 Claim. (Cl. 128—108)

This invention relates to improvements in an adjustable concave truss with controlled swivel for use on the human body in case of rupture. It has for its main objects to provide such a device that will be highly efficient for the purpose intended, comparatively cheap to manufacture, simple in structure, not easy to get out of order, very comfortable to the wearer, and extremely durable.

A further object is to provide a truss with unusually novel features by having the pads in two parts, one part rigid as the main body with a soft material covering in concave shape, and also having improved simple adjusting means to accommodate the truss to any movement of the body of the wearer.

Other objects and advantages will appear from the drawings and description.

The present invention is an improvement over the truss shown and described in my pending application in the United States Patent Office under Serial No. 772,719 filed September 8, 1947, Patent Number 2,489,831.

Figure 2:
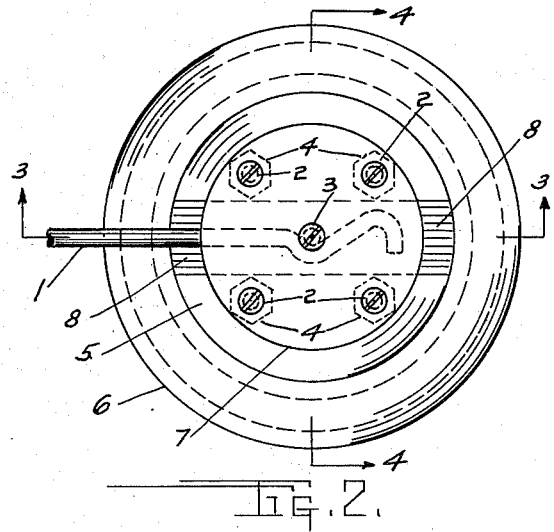
Figure 1:
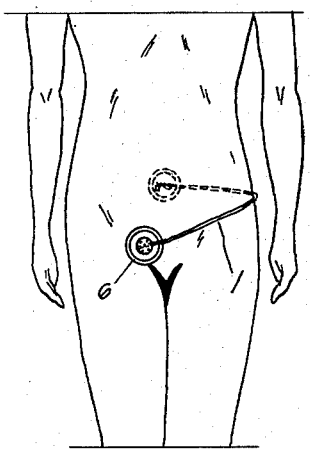
Figure 3:
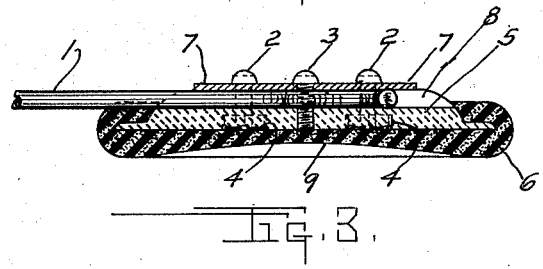
Figure 5:
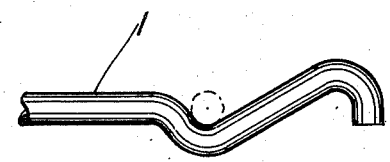
Figure 4:
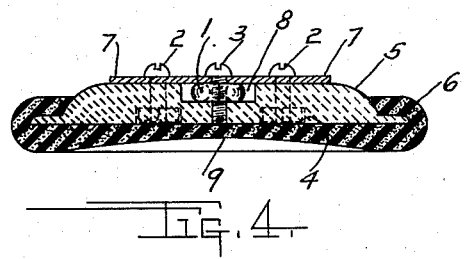
Figure 6:
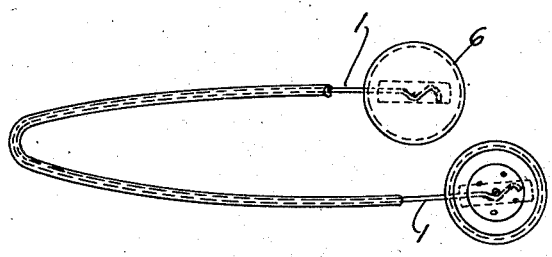

By referring generally to the drawings, part of this application, it will be observed that Fig. 1 is an elevational view of part of the front of a human body with a single type truss in place for use; Fig. 2 is an enlarged plan view of a round type truss pad, and one end of the supporting member; Fig. 3 is a sectional view of a round type pad through the channel in the rigid part of the pad, and showing the connecting means and part of one end of the wire supporting member, on line 3—3 of Fig. 2; Fig. 4 is a sectional view on line 4—4 of Fig. 2; Fig. 5 is a view of one end of the wire supporting member with the retaining screw indicated in broken lines; Fig. 6 is a general view of the assembled single type truss.

Similar reference numerals refer to similar parts throughout the several views.

Referring to the drawings in detail it will be seen that the truss comprises a main supporting member 1 preferably made of spring steel wire with any suitable protecting covering, with the assembled pads mounted on the ends thereof. Each pad assembly consists of four screws 2, a center screw 3, nuts for the four screws, a main plastic rigid body 5, a rubber concave member 6, and a disk shaped plate 7. The four screws 2 are provided with said nuts 4 that fit in recesses in the main plastic body 5. These recesses correspond in shape with the nuts to prevent the nuts from turning. The rubber concave member 6 is semi-soft, pliable, and stretchable and is adapted to fit upon the main body. A disk shaped plate 7 with holes for the screws 2 is positioned to hold the wire S shaped end in a channel 8 in the body by the screws 2 being inserted into their respective nuts 4 in the recesses of the body. The center hole of the disk is threaded for the center screw 3 to fit therein to act as means to prevent the S shaped end of the wire support from slipping out of the channel while the disk is in place and there held by the four screws 2. The rubber 6 has a concave face 9 with its other face flat to fit adjacent the flat face of the main rigid member.

From the foregoing it will appear that the S shaped end of the wire support may be held tight between the disk 7 and the bottom of the channel 8 by setting the screws 2 in tight condition, but by having the screws backed part of the way out of their nuts the S shaped ends of the wire support will be allowed to be loose to thus form swivel joints, or in other words allow the pads to rock cradle-wise on the S ends of the wire supporting member. The center screw 3 is normally set tight in the center threaded hole in the disk 7 when the truss is in use, but by unscrewing the center screw till its inner end is flush with the disk inner face, the S end of the support can be withdrawn. The S shape of the wire support ends provides means for shortening or lengthening the wire support as desired by having the center screws in the curves of the S adjacent the ends of the wire or the other curves toward the middle of the wire.

Having described my invention I claim:

A hernial truss, including a pad and a body-encircling spring steel supporting wire; the pad comprising a rigid disk-shaped intermediate member; a concaved body-contacting resilient member having a rim bent over and enclosing the rim of the rigid intermediate member, and a metal disk on the face of the intermediate member remote from the resilient member, the said remote face of the intermediate member being channeled diametrically to receive the end of the supporting wire, said end being S-shaped; a plurality of fasteners securing the metal disk and the rigid intermediate member together, whereby the S-shaped end of the supporting wire is held in the channel of the rigid intermediate member between the rigid intermediate member and the metal disk; and adjusting means passing through the metal disk, the S of the supporting wire, and the rigid intermediate member, whereby the angularity of the pad with respect to the supporting wire may be varied in accordance with the position of the adjusting means in one of the curves of the S.

ROY E. SUTHERLAND.

REFERENCES CITED

The following references are of record in the file of this patent:

UNITED STATES PATENTS

| Number | Name | Date |
|---|---|---|
| 324,586 | Pomeroy | Aug. 18, 1885 |
| 703,095 | Stewart et al. | June 24, 1902 |
| 2,142,073 | Dobbs | Dec. 27, 1938 |
| 2,318,613 | Lane | May 11, 1943 |
| 2,489,831 | Sutherland | Nov. 29, 1949 |

FOREIGN PATENTS

| Number | Country | Date |
|---|---|---|
| 623,788 | France | Mar. 22, 1927 |